United States Patent
Naick et al.

(10) Patent No.: US 7,490,082 B2
(45) Date of Patent: Feb. 10, 2009

(54) SYSTEM AND METHOD FOR SEARCHING INTERNET DOMAINS

(75) Inventors: Indran Naick, Cedar Park, TX (US); Jeffrey K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 10/942,450

(22) Filed: Sep. 16, 2004

(65) Prior Publication Data

US 2006/0059126 A1 Mar. 16, 2006

(51) Int. Cl.
*G06F 17/30* (2006.01)
(52) U.S. Cl. .................. 707/5; 707/2; 707/3; 707/102
(58) Field of Classification Search ............... 707/3, 707/5, 7, 10, 2, 102
See application file for complete search history.

(56) References Cited

U.S. PATENT DOCUMENTS

| | | | | |
|---|---|---|---|---|
| 6,285,999 | B1 * | 9/2001 | Page | 707/5 |
| 6,434,548 | B1 | 8/2002 | Emens et al. | 707/3 |
| 6,661,432 | B1 | 12/2003 | McBrearty et al. | 345/760 |
| 7,392,278 | B2 * | 6/2008 | Chen et al. | 707/3 |
| 2002/0023073 | A1 * | 2/2002 | Stern et al. | 707/1 |
| 2002/0078045 | A1 * | 6/2002 | Dutta | 707/7 |
| 2002/0107853 | A1 * | 8/2002 | Hofmann et al. | 707/7 |
| 2002/0152222 | A1 * | 10/2002 | Holbrook | 707/104.1 |
| 2003/0195877 | A1 | 10/2003 | Ford et al. | 707/3 |
| 2005/0033732 | A1 * | 2/2005 | Chang et al. | 707/2 |
| 2005/0080770 | A1 * | 4/2005 | Lueder et al. | 707/3 |
| 2005/0198070 | A1 * | 9/2005 | Lowry | 707/104.1 |
| 2005/0278321 | A1 * | 12/2005 | Vailaya et al. | 707/3 |

OTHER PUBLICATIONS

Page et al."The Anatomy of a Large-Scale Hyptertextual Web Search Engine".Apr. 14-18, 1998. WWW7 / Computer Networks. <http://www.public.asu.edu/~ychen127/cse591f05/anatomy.pdf>. pp. 1-26.*

* cited by examiner

*Primary Examiner*—Shahid A Alam
(74) *Attorney, Agent, or Firm*—Mark S. Walker; Suiter Swantz pc llo

(57) ABSTRACT

The present invention is a method and system for executing whole domain searches based on user queries and producing a result list of root nodes. The method and system comprise searching a network containing a plurality of web sites further containing a plurality of pages by examining all pages of a web site and comparing indexed terms to desired search terms. A result list of domain root nodes is returned wherein not all search terms may appear on a single document or associated page of the root page. Pages containing desired search terms may be indexed and mapped to root nodes for access from a result list.

9 Claims, 6 Drawing Sheets

100 austin house painters insured    |    search

- East Austin Painter, Finding a Painter in East Austin, House ...
... As exceptional house painters for many years, our services are ... If you need a painter in Austin, my team of ... We are the caring and responsive painters you can be ...
www.certapro.com/CraigETerry

- Painting Contractors San Diego House Painters San Diego 1 AF San ...
... Licensed, bonded, & insured. ... Alphabetical - San Diego House Painting San Diego House Painters San Diego ... 619) 276-9790 Alonso Painting 10463 Austin Dr Ste A ...
www.sandiegobizmart.com/in_san_diego/home_garden_san_diego/painting/painting_contractors1_san_diego.htm

- FunZone Commercial Connections
... Your source for house painters, interior painting, house ... foundation Repair, house leveling, UltraPile, friction piles ... helical piles, Houston Austin Dallas San ...
www.funzone.ws/zones/commercial.html

- Durango Herald - Who Can Do It
... David M. Austin General. Building Contractor. ... Bob 259-5236. (8.25). "Are you putting off doing. something around your house?". ... (8.06). AAA Master Painters. Interior & ...
durangoherald.com/includes/content/whocandoit.asp

- Real Estate Resources - Rentals, Home Improvement, Gardening, and ...
... A free apartment locator service serving Austin, San Marcos ... Cleaning Services in Nashua NH House Cleaning and ... Painting Services by Experienced Painters in NH ...
www.somanyhomes.com/Las-Vegas-real-estate-links-1.html

- Construction & Contractors, Building Materials & Supplies, Paint & ...
... & Painting Supplies, Paint Stores, House Paint in ... Show: In Austin only, Map: Show Results on Map. ... Service Interior & Exterior, Commercial & Industrial Painters. ...
phonebook.superpages.com/. ./S-TX/T-Austin/

- Heyday Home
... Addiction) on Drums and Mark Kozelek (Red House Painters) on acoustic ... Lizards June 18 San Marcos TX Monkey House (early show) June 18 Austin TX Beerland ...
www.heyday.com/home.html - 21k

- Painting Contractors
... to Coast since 1992 North America's National Painters www.certapropainters.com ... Austin Hayes Ltd, Leeds, United Kingdom Shot blasting & ... both mobile and in house. ...
www.kellysearch.com/gb-product-65639.html

FIG. 1
(Prior Art)

SYSTEM AND METHOD FOR SEARCHING INTERNET DOMAINS

FIELD OF THE INVENTION

The present invention generally relates to the field of query based Internet searching, and more particularly to a system and method for searching an entire domain using a search query.

BACKGROUND OF THE INVENTION

The Internet is a widely popular information retrieval mechanism for people with access to a communications network. Because a tremendous amount of information is available on the Internet, users often utilize search engines to locate information. Initiation of a search may generally require utilization of a search engine such as GOOGLE®, LYCOS®, YAHOO® or the like. These search tools build results from a user query, and return results in the form of a hyperlinked list of uniform resource locators (URLs) containing the requested terms. Specifically, text entered into a search field is compared against a repository of indexed words and pointers to an originating document. Search terms are matched against words and phrases on individual web pages, and a list of web pages is returned. Referring to FIG. 1, an exemplary list 100 of web pages provided by search engines known to the art is shown.

A majority of text searching algorithms is based on analyzing the content of individual documents. Conventional text searching algorithms only evaluate each document individually in a type of competition to see which documents match search criteria. When a user asks a query, he/she is looking for a small set of documents that provide an answer. Text queries tend to provide large answer sets and a one-size-fits-all relevancy ranking. These text searching algorithms typically include extracting words or phrases, creating indexing structures, and determining discriminators for calculating relevance. When a user submits a text query, the index identifies candidate documents or web pages and a resulting list is returned to the user.

Search technology has developed to provide more control regarding the appearance of a phrase or series of words on a page. For example, words must be in a specific order, words must appear near each other, or phrases cannot include certain words. The limitation on this technology, however, is that specific word combinations must appear on a single web page and not generally within an entire web site. Typically, search systems return results in the form of individual pages with corresponding URLs. These individual pages are sub-pages, or associated with a root page of a web site. Each URL must contain query terms and parameters as specified by a user. For example, a user may enter the query "X and Y" into a search system prompt. A search tool compares the query to a database, and a list of pages matching the criteria "X and Y" is returned. If "X" and "Y" are not located on the same page of a web site, the web page will not be included in the result list. Therefore, conventional search systems fail to return web sites that may contain the requested information but do not have all search terms located on a single page of the site. Therefore, a user may be prohibited from receiving possible relevant information.

Consequently, a need exists for a system and method for query based searches that provide results wherein at least one of the query terms or parameters may appear on a different page of a web site or domain.

SUMMARY OF THE INVENTION

Accordingly, the present invention is directed to a system and method for providing a query based Internet search tool that returns whole web sites containing look-up information that may be spread across multiple pages within a web site or domain. A search tool may be comprised of a network crawler, a software agent and indexing software. Indexing software used to store pointers to originating web pages may be configured to hold and compare domain information to search terms. Domain information located across recognizably grouped pages may be evaluated as a single searchable entity, and search results may be grouped according to domain. Domain home pages of web sites matching search criteria may be returned, and domain pages may be mapped to a home page and indexed for user access from a result list.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 depicts an exemplary list of web pages provided by search engines known to the art;

DETAILED DESCRIPTION OF THE INVENTION

Reference will now be made in detail to the presently preferred embodiments of the invention, examples of which are illustrated in the accompanying drawings.

Figure 2:
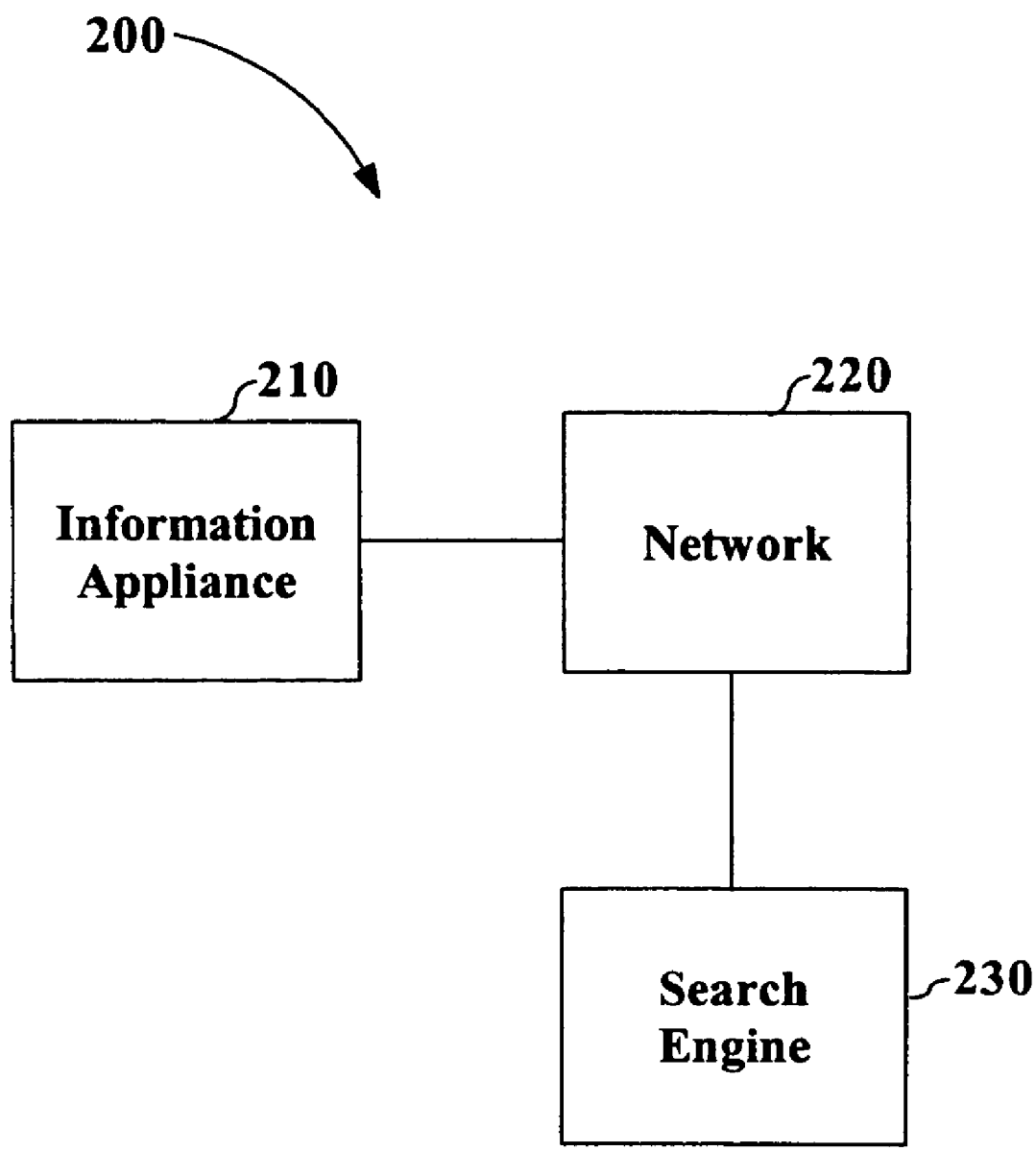
FIG. 2 is a block diagram of a system employing a search system in accordance with an embodiment of the present invention.

Referring generally to FIG. 2, a block diagram of a system 200 employing a search system in accordance with the present invention is shown. A user may in conjunction with an information appliance 210 facilitate access to a network 220. An information appliance 210 may be a personal computer, cellular phone, personal digital assistant and the like equipped with a browser application, such as a program of instructions executable on an information appliance 210, which enables a user to view hypertext markup language (HTML) documents. Information appliance 210 may be employed with an operating system such as Windows, LINUX, Macintosh or the like. An information appliance 210 may be suitable for gaining access to a worldwide network 220, such as the Internet and World Wide Web.

Search engine 230, may reside on a server, the server being an element of the worldwide network 220. Search engine 230 may refer to an application that searches for keywords in files and documents available on the worldwide network 220. It is contemplated that the search engine in accordance with the present invention may be integrated as a selectable option on an Internet browser such as Microsoft Internet Explorer, Netscape Navigator or a like browser. The present invention may also be implemented as a third-party command button or control key added to the web browser interface. In an embodiment of the invention, search engine 230 may retrieve a list of whole web sites associated with particular search term(s).

A web site is a group of related HTML documents and associated files, scripts and databases available through a hypertext transfer protocol (HTTP) server on the World Wide Web. A web site often has a starting point, generally referred to as a home page, root page or root node, which is generally assigned a domain name, such as "www.ibm.com." Home pages generally contain hyperlinks to other pages within a web site, and may contain links to other websites or pages outside a domain.

Figure 3:
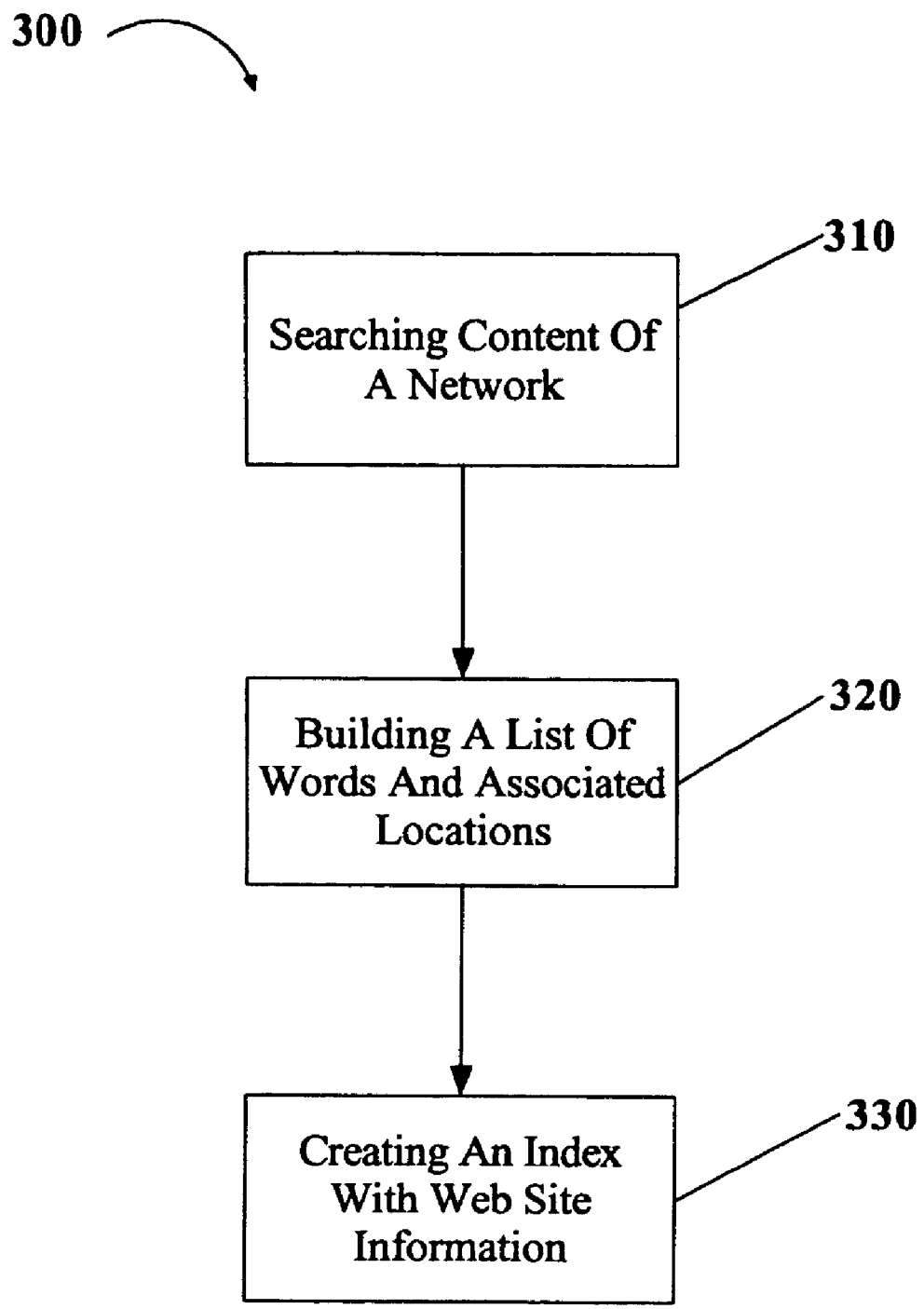
FIG. 3 is a flow diagram of a search method in accordance with an embodiment of the present invention.

Referring generally to FIG. 3, a flow diagram of a method 300 for indexing content in accordance with the present invention is shown. Method 300 may begin searching content of a network 310. In an embodiment of the invention, a network crawler or spider may be employed to search and gather web site information. A network crawler may find and search substantially all web sites available on a network. A network crawler is a software program that automatically traverses a network's hypertext structure by retrieving a document and recursively retrieving all documents referenced by the original document. A network crawler may then find and follow links to other pages on a home page, further follow each link on a subsequent page and so on.

The next step of method 300 may be building a list of words and locations of the words 310. From the list of words and locations, an index may be created 330. Indexing software may extract information from documents and index the information by placing it into a database. Each word in a document may be indexed, or indexing software may only index key words. Additional indexed information may include document size, title, headings, subheadings or the like. It is contemplated that the index may also be built according a system of weighing search results whereby the list of most relevant search results is provided first followed by less relevant results.

The index of the present invention may hold and compare domain information i.e. web site information rather than web page information. The domain information may be utilized to group returned search terms as if it were a single searchable entity. In an advantageous aspect of the present invention, a list of whole domains may be provided which contain a search term on some pages while other search terms appear on other pages of the web site.

Figure 4:
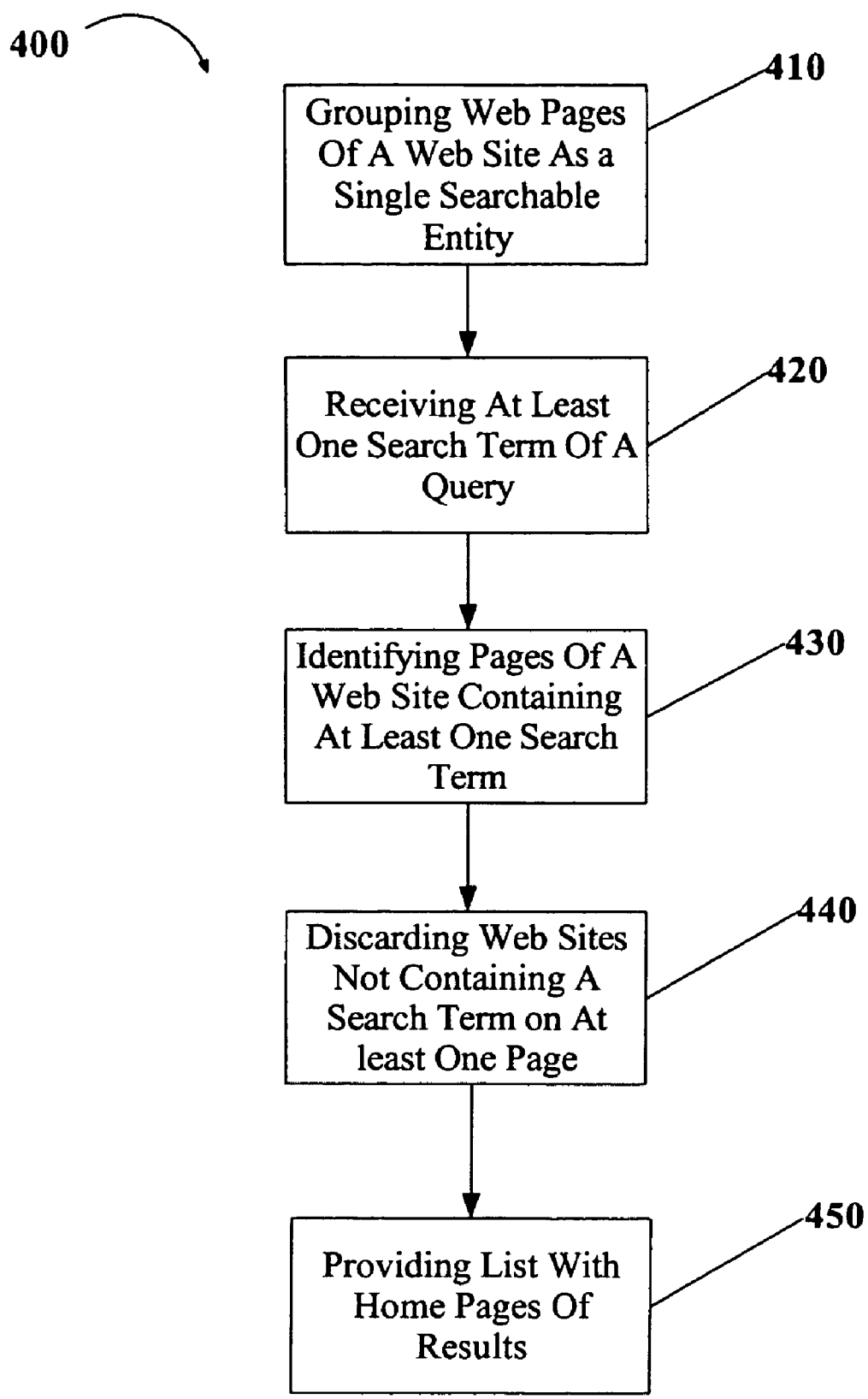
FIG. 4 is a flow diagram of a process of retrieving search results with home pages of web sites in accordance with an embodiment of the present invention.

Referring to FIG. 4, a flow diagram of a search method 400 in accordance with the present invention is shown. The search method 400 may be performed by program instructions stored on a computer readable storage medium. A search tool in accordance with the present invention may utilize indexing software that gathers and compares pages of a web site to a search query, grouping pages as if they were a single searchable entity 410. For example, web pages comprising a web site may be determined. A user may enter a search query into a search engine, the search engine receiving at least one search term 420. Individual pages of a web site containing at least one desired search terms may subsequently be identified and held 430. This may be advantageous as the pages containing at least one search term may be presented to a user. In an alternative embodiment of the invention, pages containing at least one term may not be identified.

In an embodiment of the invention, if a user were to type the query: "house painters Austin insured" into a search system, a web site matching this criteria may have search terms located on different pages. The home page or root node of a web site might contain the phrase "Voted Best House Painters—1998." A subsequent page, such as an about page, may state, "We are fully insured." A location page may list an address as "1 Main Street, Austin, Tx." Utilizing a search system in accordance with the present invention, a user may be brought to the root page of the web site containing the requested information, even though no one page on the web site contains all desired terms.

After each page of a web site has been evaluated, web sites not containing a search term on at least one page are discarded 440. Result pages may be grouped and a home page URL may be returned 450. In an embodiment of the invention, a network crawler or spider may determine a web page's home page by dropping all characters in a page's URL after the first forward slash (/). Alternative methods for determination of a home page may also be utilized.

Figure 5A:
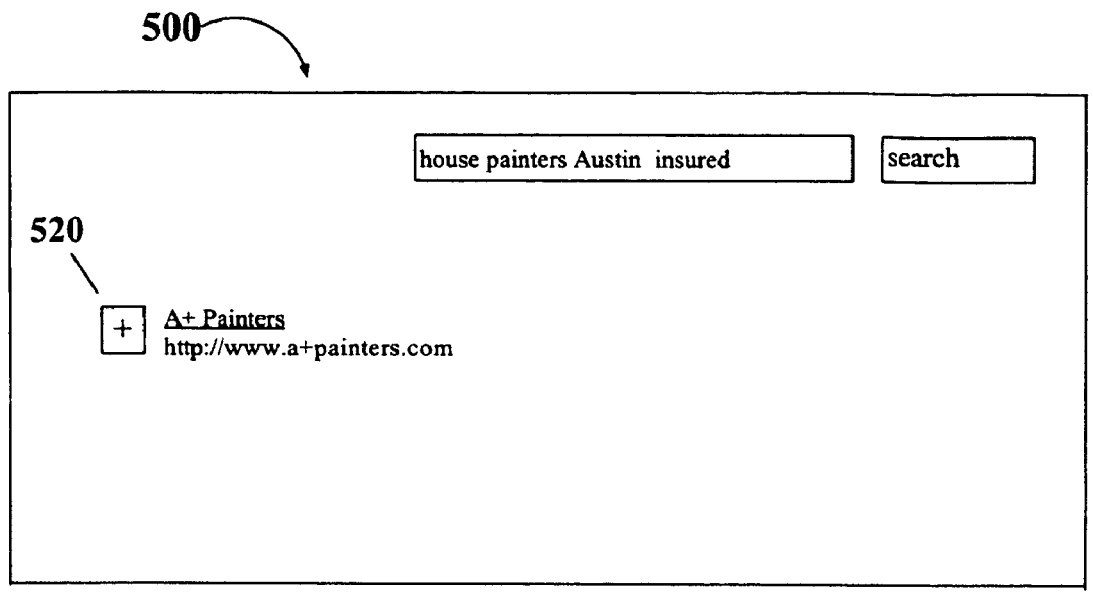
FIGS. 5A and 5B are depictions of a sample result list from a search in accordance with an embodiment of the present invention.
Figure 5B:
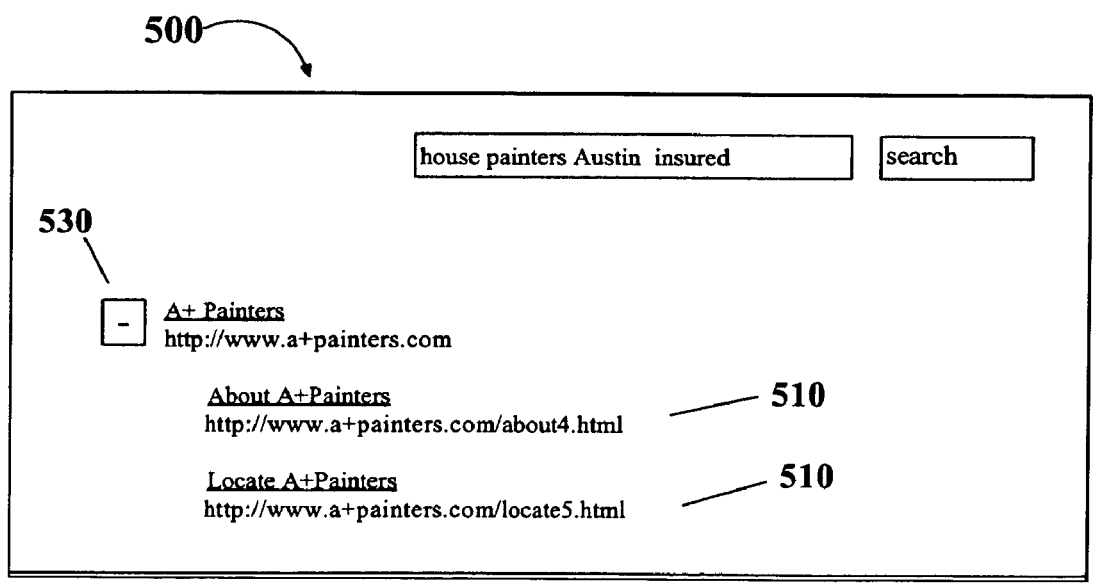

A navigation tool such as a search request dialogue box may be integrated into the search system, allowing a user to dynamically search the web site for other search terms. For example, a search system may be implemented with a "GO TO" button that allows users to traverse through a web site to associated pages containing other search terms. Alternatively, associated pages of a web site may be automatically mapped to a home page and a hyperlinked index of pages may be generated by search system. For example, web site pages containing search terms may be indexed and mapped to a web site's home page. An indexing function 500 may be represented by a +/− icon, arrow icon or the like located next to each domain listed as shown generally in FIGS. 5A and 5B. A user may access relevant pages 510, which may be displayed as hyperlinks upon clicking the indexing icon. For example, when associated pages 510 are hidden, the +/− icon may be set at "+" 520 or the arrow may point toward a domain listing. Upon clicking the icon to reveal the indexed list of page hyperlinks, the "+" may change into a "−" 530, or the arrow may point downward. It is contemplated that relevant pages 510 may be determined as described in step 430 of FIG. 4 whereby pages of a web site containing at least one search term may be identified. Additionally, a result list generated by a search system in accordance with the present invention may also include a hyperlink to a page of the web site containing most terms or terms designated most important.

Search logic may be substantially similar to that of conventional search systems. Simple searches may be initiated utilizing words, phrases or natural language sentence queries by matching search terms to web sites in a look-up table or database. It is preferred that search logic is adapted to appropriately respond to more complex searching techniques. For example, a Boolean search utilizing a NOT search term may be executed differently with the present invention than with a conventional search system. In accordance with the present invention, NOT terms may search for whole sites that do not contain those terms, or the excluded terms may simply be required NOT to be on pages where other searchable terms are found. Searches may provide targeted results by user categorization of search terms as general, specific, or the like, or search terms may be ranked to indicate priority of appearance within a domain.

A search system in accordance with the present invention may rank returned results based on a number of criteria. For example, domains with all or most search terms located on a homepage or root node of a web site may be returned first. Domains with terms located a distance apart may be returned further down the result list. A user may set search parameters to include or discard results based on distance between search terms within a domain or proximity of search terms to one another on a page.

Figure 6:
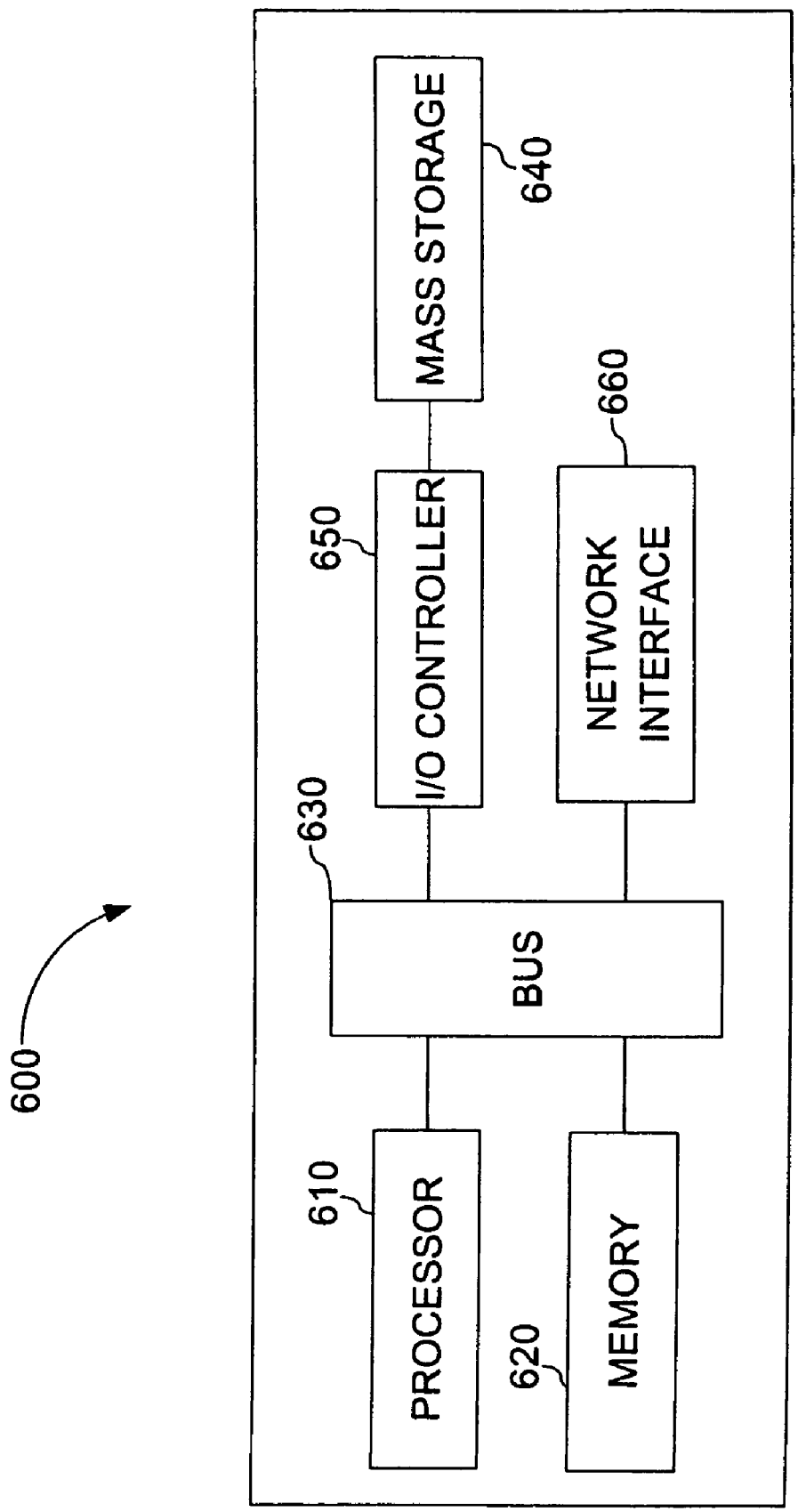
FIG. 6 is a block diagram of an information appliance in accordance with an embodiment of the present invention.

Referring to FIG. 6, a block diagram of a computing system 600 in accordance with an embodiment of the present invention is shown. Computing system 600 may be representative of an information appliance 210 of FIG. 2. Further, computing system 600 may be representative of a search engine 230 of FIG. 2.

Computing system 600 may include conventional components such as a processor 610, memory 620 (e.g. RAM), a bus 630 which couples the processor 610 and memory 620, a mass storage device 640 (e.g. a magnetic or optical disk) coupled to the processor 610 and memory 620 through an input output (I/O) controller 650 and a network interface 660, such as a modem.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing search results for a network, said network having a plurality of sites, comprising:
    indexing a plurality of pages included in a site of said plurality of sites into a single searchable entity;
    receiving a query, said query including at least two search terms and a NOT term;
    searching said single searchable entity based on said query;
    discarding an additional site of said plurality of sites when a first page included in said additional site of said plurality of sites does not contain said first term of said at least two search terms and a second page included in said additional site of said plurality of sites does not contain said second term of said at least two search terms; and
    providing a list including a root page included in said site of said plurality of sites when a first page included in said site of said plurality of sites contains a first search term of said at least two search terms but not a second search term of said at least two search terms and a second page included in said site of said plurality of sites contains said second search term of said at least two search terms but not said first search term of said at least two search terms, said list is ranked according to a weighing system.

2. The method as claimed in claim 1, wherein said providing a list including a root page included in said site of said plurality of sites when a first page included in said site of said plurality of sites contains a first search term of said at least two search terms but not a second search term of said at least two search terms and a second page included in said site of said plurality of sites contains said second search term of said at least two search terms but not said first search term of said at least two search terms comprises:
    providing said list including said root page included in said site of said plurality of sites when said site of said plurality of sites does not include a page that contains said NOT term.

3. The method as claimed in claim 1, further comprising providing a list of pages included in said site of said plurality of sites which contain at least one of said first search term of said at least two search terms and said second term of said at least two search terms.

4. A computer system, including at least one processor, at least one memory, and at least one bus which couples the at least one processor and at least one memory, for providing search results for a network, said network having a plurality of sites, the computer system comprising:
    means for indexing a plurality of pages included in a site of said plurality of sites into a single searchable entity;
    means for receiving a query, said query including at least two search terms and a NOT term;
    means for searching said single searchable entity based on said query;
    means for discarding an additional site of said plurality of sites when a first page included in said additional site of said plurality of sites does not contain said first term of said at least two search terms and a second page included in said additional site of said plurality of sites does not contain said second term of said at least two search terms; and
    means for providing a list including a root page included in said site of said plurality of sites when a first page included in said site of said plurality of sites contains a first search term of said at least two search terms but not a second search term of said at least two search terms and a second page included in said site of said plurality of sites contains said second search term of said at least two search terms but not said first search term of said at least two search terms, said list is ranked according to a weighing system.

5. The computer system as claimed in claim 4, wherein said means for providing a list including a root page included in said site of said plurality of sites when a first page included in said site of said plurality of sites contains a first search term of said at least two search terms but not a second search term of said at least two search terms and a second page included in said site of said plurality of sites contains said second search term of said at least two search terms but not said first search term of said at least two search terms further comprises means for providing said list including said root page included in said site of said plurality of sites when said site of said plurality of sites does not include a page that contains said NOT term.

6. The computer system as claimed in claim 4, further comprising means for providing a list of pages included in said site of said plurality of sites which contain at least one of said first search term of said at least two search terms and said second term of said at least two search terms.

7. A computer readable storage medium containing program instructions for providing search results for a network, said network having a plurality of sites, the program instructions comprising:
    indexing a plurality of pages included in a site of said plurality of sites into a single searchable entity;
    receiving a query, said query including at least two search terms and a NOT term;
    searching said single searchable entity based on said query;
    discarding an additional site of said plurality of sites when a first page included in said additional site of said plurality of sites does not contain said first term of said at least two search terms and a second page included in said additional site of said plurality of sites does not contain said second term of said at least two search terms; and
    providing a list including a root page included in said site of said plurality of sites when a first page included in said site of said plurality of sites contains a first search term of said at least two search terms but not a second search term of said at least two search terms and a second page included in said site of said plurality of sites contains said second search term of said at least two search terms but not said first search term of said at least two search terms, said list is ranked according to a weighing system.

8. The computer readable storage medium as claimed in claim 7, wherein said providing a list including a root page included in said site of said plurality of sites when a first page included in said site of said plurality of sites contains a first search term of said at least two search terms but not a second search term of said at least two search terms and a second page included in said site of said plurality of sites contains said second search term of said at least two search terms but not said first search term of said at least two search terms comprises:

provM said list including said root page included in said site of said plurality of sites when said site of said plurality of sites does not include a page that contains said NOT term.

9. The computer readable storage medium as claimed in claim 8, further comprising providing a list of pages included in said site of said plurality of sites which contain at least one of said first search term of said at least two search terms and said second term of said at least two search terms.

* * * * *